United States Patent [19]
Jacoby et al.

[11] 3,818,837
[45] June 25, 1974

[54] VEHICLE AND TRACK SYSTEM
[75] Inventors: Charles E. Jacoby, Bethlehem; Per Eric Lindqvist, Easton, both of Pa.
[73] Assignee: SI Handling Systems, Inc., Easton, Pa.
[22] Filed: Oct. 6, 1972
[21] Appl. No.: 295,766

[52] U.S. Cl. ............................................. 104/166
[51] Int. Cl. ........................................... B61b 13/00
[58] Field of Search .............. 104/165, 166; 103/26

[56] References Cited
UNITED STATES PATENTS
3,604,362  9/1971  Goirand .......................... 104/166
3,650,216  3/1972  Broome ............................ 104/166

FOREIGN PATENTS OR APPLICATIONS
1,033,823  6/1966  Great Britain ..................... 104/166

Primary Examiner—M. Henson Wood, Jr.
Assistant Examiner—D. W. Keen
Attorney, Agent, or Firm—Seidel, Gonda & Goldhammer

[57] ABSTRACT

A vehicle for use on a track system has a speed control means on its front end for cooperation with a cam on the rear end of the next vehicle on the track system to effect dense accumulation of vehicles along the system.

13 Claims, 3 Drawing Figures

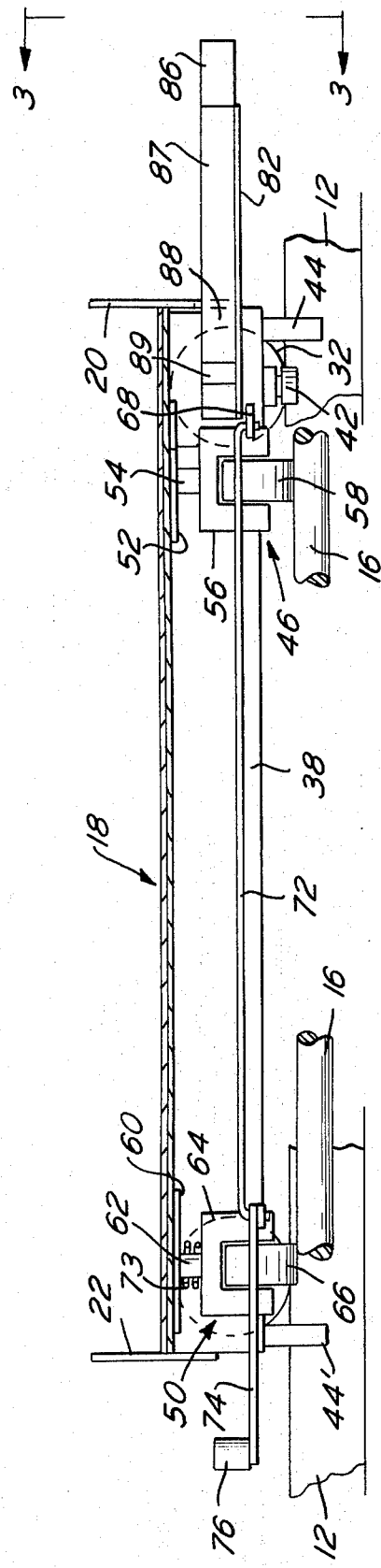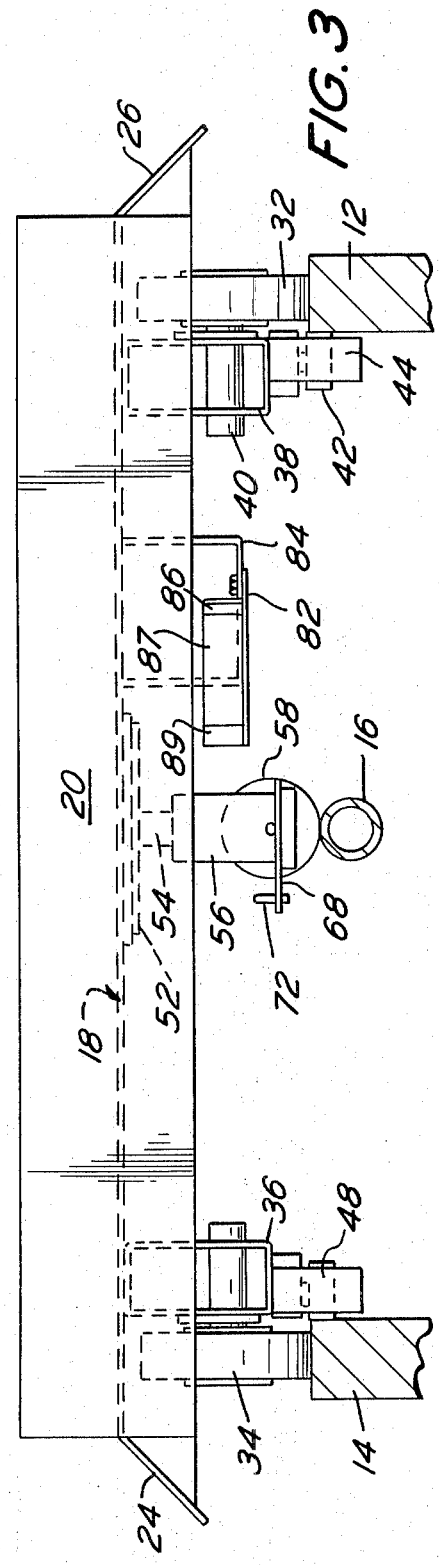

VEHICLE AND TRACK SYSTEM

This invention is directed to a vehicle and track system wherein a drive means forming a part of the system and being of the rotating type is utilized to propel the vehicle along the system. A typical example of a vehicle which is propelled by the track system is shown in U.S. Pat. No. 3,356,040 dated Dec. 5, 1967. Vehicles which are propelled by the system as disclosed in said patent are different from vehicles propelled by a tow line cooperating with a tow pin such as is disclosed in U.S. Pat. No. 3,291,070 dated Dec. 13, 1966.

In accordance with the present invention, the vehicles are constructed in a manner whereby dense accumulation of vehicles is provided along the length of the system. In this manner, a substantially larger number of vehicles are used in the system as compared with a system utilizing vehicles of the type disclosed in said U.S. Pat. No. 3,356,040.

In order that the number of vehicles in the system may be at a maximum for maximum efficiency, the vehicles have a speed control device on their rear end for cooperation with a drive control member on the front end of the next adjacent vehicle. The speed control devices are preferably in the form of cams. The contact between a cam on one vehicle and the drive control member on the next vehicle therebehind causes the last-mentioned vehicle to accumulate or stop along the track system. Each cam is provided with a contour whereby descent and/or acceleration is gradual.

It is an object of the present invention to provide a novel vehicle.

It is another object of the present invention to provide a novel track system having maximum density of vehicles.

It is another object of the present invention to provide a novel vehicle which is adapted to cooperate with an adjacent vehicle and control the speed of the adjacent vehicle.

It is a still further object of the present invention to provide a novel vehicle constructed in a manner which enables it to control the speed of the next adjacent vehicle by structure which is simple, reliable, and inexpensive.

Other objects will appear hereinafter.

For the purpose of illustrating the invention, there is shown in the drawings a form which is presently preferred, it being understood, however, that this invention is not limited to the precise arrangements and instrumentalities shown.

FIG. 2 is a sectional view taken along the line 2—2 in FIG. 1.

FIG. 3 is a sectional view taken along the line 3—3 in FIG. 2.

Figure 1:
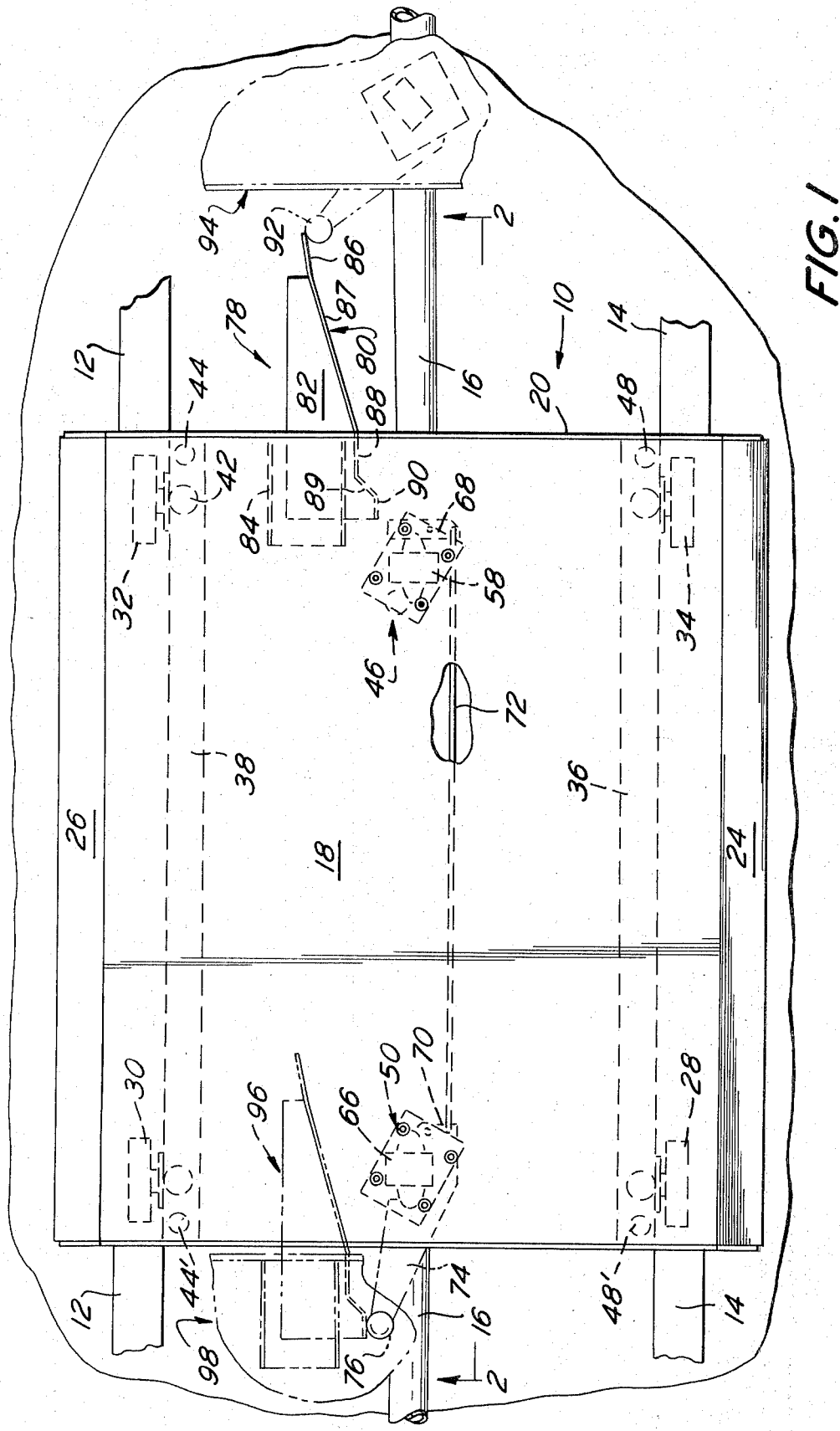
FIG. 1 is a top plan view of a system incorporating the vehicle.

Referring to the drawings in detail, wherein like numerals indicate like elements, there is shown in FIG. 1 a system and vehicle in accordance with the present invention. The vehicle is designated generally as 10 and is adapted to ride along the tracks 12 and 14 of the system. The system also includes a drive shaft means 16 which is preferably a plurality of interconnected cylinders or rods parallel to the tracks 12 and 14 and mounted for rotation about a longitudinal axis. A drive motor, not shown, is connected to the drive shaft means 16 to effect such rotation of drive shaft means about its longitudinal axis.

The vehicle 10 includes a frame having a generally horizontal platform 18 on which goods or articles may be supported for movemenet along the track system. The frame includes a front wall 20 and a rear wall 22 as well as side skirts 24 and 26. The skirts provide for ease of loading or unloading and for use as a destination indicator.

The vehicle 10 is supported on the tracks 12 and 14 for movement therealong by wheels 28, 30, 32, and 34. The wheels 28–34 may rotate about horizontal axes as will be described hereinafter or may rotate about vertical axes as disclosed in the aforementioned U.S. Pat. No. 3,356,040.

As illustrated in the drawings, the wheels 28–34 are connected to the frame of the vehicle 10 by means of hollow channel members. Thus, wheels 28 and 34 are connected to the vehicle frame by means of channel member 36 while wheels 30 and 32 are connected to the frame by channel member 38. The relationship between each of the wheels 28–30 and its respective channel member is identical. Accordingly, it is deemed sufficient to only describe the relationship existing between wheel 32 and channel member 38.

Wheel 32, as shown more clearly in FIG. 3, is provided with an axle 40 journaled in channel member 38 for rotation about a horizontal axis. A guide roller 42 is supported by channel member 38 adjacent wheel 32 for rotation about a vertical axis. While wheel 32 rides on top of track 12, roller 42 engages the inner or side face of track 12. A support post 44 depends from channel member 38 in a position adjacent a corner of the vehicle frame. The length of the support post 44 is sufficient so as to be below the plane tangent to the upper periphery of the drive means 16 for a reason to be made clear hereinafter.

For purposes of illustration, the support post 44 is in one rear corner of the vehicle 10. The support post in the other rear corner is designated as 48. The corresponding support posts at the front end of the vehicle 10 are designated 44' and 48' respectively. As will be apparent from the drawing, each of the wheels 28–34 has associated with it a guide wheel comparable to guide wheel 42 to maintain the vehicle 10 on the track. Other comparable devices may be utilized if desired. It is not necessary for the channel members 36 and 38 to extend for substantially the full length of the vehicle frame, but it is preferred since they perform the added function of providing rigidity so that heavy loads may be supported by the vehicle. The vehicle 10 is provided with at least one drive wheel means. For heavy loads, the vehicle is preferably provided with two drive wheel means such as drive wheels means 46 and 50 supported on the bottom side of the vehicle frame.

The drive wheel means 46 includes an upright shaft 54 supported along the longitudinal axis of the vehicle 10 by plate 52 on the bottom side of the vehicle frame. The drive wheels means 46 is mounted for oscillation about the axis of shaft 54. Shaft 54 is connected to a yoke-like support 56. Drive wheel 58 is mounted on support 56 for rotation about a horizontal axis. Drive wheel 58 contacts the periphery of drive shaft means 16 and is driven thereby depending upon the angular position of drive wheel 58.

The drive wheel means 50 includes an upright shaft 62 supported along the longitudinal axis of the vehicle 10 by plate 60 on the bottom side of the vehicle frame. Drive wheel means 50 is mounted for oscillation about the axis of shaft 62. Shaft 62 is connected to a yoke-like support 64. Drive wheel 66 is mounted on the support 64 for rotation about a horizontal axis. Drive wheel 66 contacts the periphery of drive shaft means 16 and is driven thereby depending upon the angular position of wheel 66.

A bracket 68 is fixed to the yoke-like support 56. A bracket 70 is fixed to the yoke-like support 64. The brackets 68 and 70 are coupled together by the connecting member 72. Member 72 is parallel to the drive shaft means 16. In FIGS. 1 and 2, the wheels 58 and 66 are in the stop or accumulation position of the vehicle 10 since their axis of rotation is parallel to the longitudinal axis of drive shaft means 16.

Each of the drive wheel means 46 and 50 are adapted to oscillate through an arc of about 30° in a clockwise direction in FIG. 1 to the full drive position. The speed of the vehicle 10 increases progressively as the angle between the axis of the drive shaft means 16 and the axes of rotation of the wheels 58 and 66 increases. The drive wheel means 46 and 50 are biased to the full drive position by a torsion spring 73 shown at the lefthand end of FIG. 2. Other equivalent means may be substituted for spring 73 to attain such effect.

The drive control 74 is connected to the brackets 70 to effect oscillation of the drive wheel means 50. Member 74 extends forwardly behind the front end of the vehicle 10. Member 74 at its free end is provided with an upright cam follower 76.

A speed control device 78 is supported by the vehicle 10 and projects generally rearwardly beyond the rear end of the vehicle 10. Device 78 includes cam 80 connected by brace 82 to a bracket 84 on the bottom side of the frame of the vehicle 10. The distance between the surface of cam 80 and the longitudinal axis of the drive shaft means 46 increases to a maximum as one travels in a rearward direction away from the vehicle 10. That is, the surface of cam 80 converges from its free end toward the longitudinal axis of the drive shaft means 16.

At its free end, cam 80 has a cam portion 86 which converges toward the drive shaft means 16 at a slight angle. The next adjacent portion 87 on cam 80 converges toward the drive shaft means 16 at a greater angle. Portions 86 and 87 define a majority of the length of cam 80.

The next cam portion 88 is generally parallel to the drive shaft means 16. The next cam portion 89 is the shortest converging portion of cam 80 while the included angle with the axis of drive shaft means 16 is the largest angle. The last portion 90 on cam 80 is parallel to the longitudinal axis of drive shaft means 16.

The speed control device 78 on the vehicle 10 is at an elevation which corresponds to the elevation of the cam follower 76. Since all of the vehicles insofar as this feature is concerned, are the same, cam 80 on vehicle 10 may cooperate with cam follower 92 on vehicle 94 to cause vehicle 94 to stop. Vehicle 98, which is in front of vehicle 10 in the system, has a speed control device 96 which cooperates with cam follower 76 to cause vehicle 10 to stop. Each of the vehicles 10, 94, and 98 are preferably identical insofar as the drive control member, speed control device, and drive wheel means are concerned.

Each of the vehicles has a speed control device which controls the speed of the vehicle behind it in the system. The brace 82 on each vehicle is longitudinally adjustable relative to its respective bracket 84 by a bolt-slot arrangement so that vehicle 94 may be caused to come to a complete stop at a location about 1 or 2 inches away from the rear end of vehicle 10. Thus, in FIG. 1, vehicles 10 and 98 are stopped due to the cam follower 76 being opposite the portion of speed control means 96 which corresponds to cam portion 90. Vehicle 94 has been illustrated in a position to show the cam follower 92 in its full speed position. Vehicle 94 will gradually and smoothly decelerate from full speed to a complete stop as cam follower 92 traverses the length of cam 80. It has been found that this may be accomplished with a cam 80 having a length of about 18 inches.

Vehicles such as those described above may automatically accumulate in a zone along the track system by the drive control member on one vehicle contacting the speed control device on the vehicle in front of it. Any desired function, such as loading or unloading may be accomplished at the accumulation zone. The first vehicle in the accumulation zone is prevented from moving forward by a blocking member which engages the frame of the first vehicle without any contact between the blocking member and the drive control member on the first vehicle. Hence, the drive wheels for the first vehicle and the accumulation zone would be in their full drive position so that said first vehicle will move out rapidly when the blocking member is removed. Thereafter, the remaining vehicles will progressively become spaced from one another if they move out of the accumulation zone en masse or may be permitted to individually depart from the accumulation zone by repeated actuation of the blocking member.

The blocking member is preferably an upright channel member or beam which moves from an upper position where it blocks the first vehicle to a lower position wherein the vehicle clears the upper end of the blocking member. The blocking member should be sufficiently strong so as to overcome the propelling force imparted to the first vehicle by the drive shaft means 16 which continuously rotates. Any conventional device such as a power cylinder or lever arm may be used to cause movement of the blocking member between its upper and lower positions.

While vehicle 10 is caused to smoothly decelerate from full speed to zero over a linear distance of about 18 inches, it should be noted that the cam follower 76 only projects from the vehicle 10 for a maximum distance of about 6 inches when the speed of the vehicle 10 is zero. In order that this may be accomplished, about 5 inches of the length of each speed control device is beneath its respective vehicle with the remainder projecting beyond the rear end of the vehicle. The front end of each vehicle is provided with an opening or space for receiving the projecting portion of the speed control device on each vehicle. In this manner, the two vehicles will come to a complete stop with about 1 inch between the vehicles.

The support posts 44, 44', 48, 48' are of such a length that they permit the vehicles to be set down on the floor or stacked on one another without causing any damage to the drive wheel. Thus, the height of the post is such that their lower end would space the drive wheels 58 and 68 from any such supporting surface.

Each of the vehicles may be one or more drive wheel means. The use of two drive wheel means on each vehicle facilitates the vehicle carrying heavier loads and provides the added advantage of spanning gaps in the drive shaft means which is comprised of cylinders interconnected end to end. The track system need not be a straight track but may have right angle portions with the vehicles being transferred from one portion of the track system to another in any convenient manner such as by use of a turntable.

The present invention may be embodied in other specific forms without departing from the spirit or essential attributes thereof and, accordingly, reference should be made to the appended claims, rather than to the foregoing specification as indicating the scope of the invention.

It is claimed:

1. Apparatus comprising a vehicle mounted on wheels adapted to ride on a track, at least one drive wheel means on the bottom side of said vehicle, said drive wheel means including a drive wheel oscillatable about an upright axis, a control member projecting forwardly of the vehicle and terminating a free end, said control member being coupled to said drive wheel for oscillating said drive wheel, said control member being mounted for oscillation between an accumulation position and a drive position, and a speed control device supported by the vehicle and projecting generally rearwardly of the vehicle beyond the rear end thereof, the projection of said device terminating in a free end and being at the same general elevation as said control member so that it may oscillate a control member on another vehicle to control the speed of the other vehicle.

2. Apparatus in accordance with claim 1 wherein said speed control device includes a cam surface partially disposed beneath said vehicle and partially projecting beyond the rear end of said vehicle.

3. Apparatus in accordance with claim 1 wherein said drive wheel means includes a drive wheel support, said drive wheel being mounted on said support for rotation about a horizontal axis, said control member being rigidly connected with said drive wheel support.

4. Apparatus in accordance with claim 1 wherein said vehicle includes first and second drive wheel means spaced form one another along a central portion of the vehicle, and a connecting member extending between each drive wheel means so that they may oscillate in unison.

5. Apparatus in accordance with claim 1 including a track, a drive shaft means, said drive wheel periphery being in contact with the periphery of said drive shaft means which is rotatable about its longitudinal axis, said speed control device having a first end which is said free end and a second end, said second end of said device being closer to the longitudinal axis of said drive shaft means as compared with said free end of the device.

6. Apparatus in accordance with claim 5 wherein said speed control device includes a cam surface, a portion of which is parallel to the longitudinal axis of said drive shaft means.

7. Apparatus in accordance with claim 1 wherein the periphery of said drive wheel projects below a horizontal plane containing the wheels of the vehicle adapted to ride on a track, and said vehicle having support posts which depend downwardly from the bottom side of the vehicle for a distance which is below the horizontal plane containing the drive wheel so that the support posts may support the vehicle on a supporting surface without contact between the drive wheel and said support surface.

8. A vehicle in accordance with claim 1 wherein the wheels which are adapted to ride on the track rotate about a horizontal axis, a channel member on the vehicle supporting each wheel axis at two places along the wheel axis.

9. Apparatus comprising a vehicle having a platform mounted on wheels, said wheel being adapted to ride on a track, at least one drive wheel means on the vehicle below the platform, said drive wheel means including a drive wheel oscillatable about an upright axis, a ontrol member below said platform and projecting from one end of the vehicle and terminating in a free end, a speed control device supported by the vehicle below said platform, said speed control device projecting beyond the other end of the vehicle and terminating in a free end, said speed control device being at the same general elevation as said control member so that said speed control device may cooperate with a control member on another vehicle to control the speed of the other vehicle, and one of said control member and speed control devices being coupled to said drive wheel for oscillating said drive wheel and being mounted for oscillation between an accumulation position and a drive position.

10. Apparatus in accordance with claim 9 wherein said control member is a cam follower, and said speed control device includes a cam surface.

11. Apparatus in accordance with claim 10 wherein said cam surface is partially disposed beneath said platform and partially projects beyond said other end of said vehicle.

12. Apparatus in accordance with claim 9 wherein said drive wheel means includes a drive wheel support, said drive wheel being mounted on said drive wheel support for oscillation therewith, said control member being rigidly connected with said drive wheel support for oscillation therewith between said accumulation position and said drive position.

13. Apparatus comprising a vehicle having a platform mounted on wheels, said wheels being adapted to ride on a track, at least one drive wheel means on the vehicle below the platform, said drive wheel means including a drive wheel oscillatable about an upright axis, a control member including a cam follower located adjacent one end of the vehicle, a speed control device including a cam surface supported by the vehicle and being located adjacent the other end of the vehicle, one of said control members and speed control devices being coupled to said drive wheel for oscillating said drive wheel and being mounted for oscillation between an accumulation position and a drive position, one of said cam surface and cam follower projecting beyond its respective end of said platform, said cam surface being at the same general elevation as said cam follower so that said speed control device may cooperate with a control member on another vehicle to control the speed of the other vehicle.

* * * * *

REEXAMINATION CERTIFICATE (511th)

United States Patent [19]

Jacoby et al.

[11] B1 3,818,837

[45] Certificate Issued May 27, 1986

[54] VEHICLE AND TRACK SYSTEM

[75] Inventors: Charles E. Jacoby, Bethlehem; Per Eric Lindqvist, Easton, both of Pa.

[73] Assignee: SI Handling Systems, Inc., Easton, Pa.

Reexamination Request:
No. 90/000,431, Aug. 8, 1983

Reexamination Certificate for:
Patent No.: 3,818,837
Issued: Jun. 25, 1974
Appl. No.: 295,766
Filed: Oct. 6, 1972

[51] Int. Cl.⁴ .................................. B61B 13/12
[52] U.S. Cl. ........................................ 104/166

[58] Field of Search ..................... 104/165, 166; 280/33.99 T, 43.12, 43.14, 43.24

[56] References Cited

U.S. PATENT DOCUMENTS

| | | | |
|---|---|---|---|
| 423,871 | 3/1890 | Judson | 104/166 |
| 2,885,969 | 5/1959 | Kay et al. | 104/172 S |
| 3,044,416 | 7/1962 | Reibel | 104/172 S |
| 3,315,614 | 4/1967 | Braun, Jr. | 104/172 BT |
| 3,343,499 | 9/1967 | Burrows | 104/172 B |
| 3,356,040 | 12/1967 | Fonden | 104/130 |
| 3,397,650 | 8/1968 | Kondur et al. | 104/172 S |
| 3,423,101 | 1/1969 | Boeye | 280/43.24 |

*Primary Examiner*—Randolph A. Reese

[57] ABSTRACT

A vehicle for use on a track system has a speed control means on its front end for cooperation with a cam on the rear end of the next vehicle on the track system to effect dense accumulation of vehicles along the system.

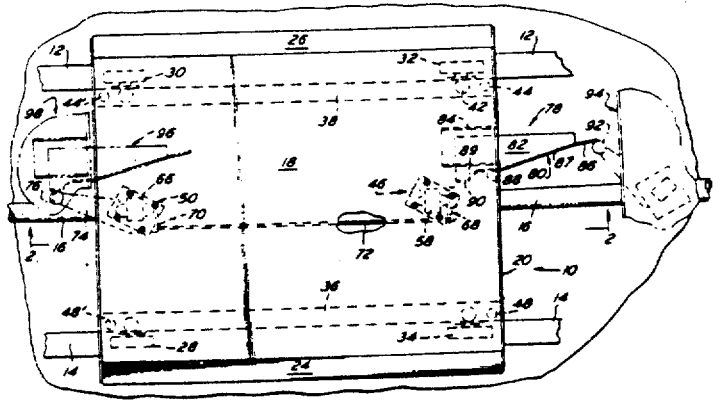

B1 3,818,837

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9-12 is confirmed.

Claims 1 and 3 are cancelled.

Claims 2, 4, 5, 7, 8 and 13 are determined to be patentable as amended.

Claim 6, dependent on an amended claim, is determined to be patentable.

New claims 14-22 are added and determined to be patentable.

2. Apparatus in accordance with claim [1] *14* wherein said speed control device includes a cam surface partially disposed beneath said vehicle and partially projecting beyond the rear end of the said vehicle.

4. Apparatus in accordance with claim [1] *14* wherein said vehicle includes first and second drive wheel means spaced [form] *from* one another along a central portion of the vehicle, and a connecting member extending between each drive wheel means so that they may oscillate in unison.

5. Apparatus in accordance with claim [1] *14* including a track, a drive shaft means, said drive wheel periphery being in contact with the periphery of said drive shaft means which is rotatable about its longitudinal axis, said speed control device having a first end which is said free end and a second end, said second end of said device being closer to the longitudinal axis of said drive shaft means as compared with said free end of the device.

7. Apparatus in accordance with claim [1] *14* wherein the periphery of said drive wheel projects below a horizontal plane containing the wheels of the vehicle adapted to ride on a track, and said vehicle having support posts which depend downwardly from the bottom side of the vehicle for a distance which is below the horizontal plane containing the drive wheel so that the support posts may support the vehicle on a supporting surface without contact between the drive wheel and said support surface.

8. A vehicle in accordance with claim [1] *14* wherein the wheels which are adapted to ride on the track rotate about a horizontal axis, a channel member on the vehicle supporting each wheel axis at two places along the wheel axis.

13. Apparatus comprising a vehicle having a platform mounted on wheels, said wheels being adapted to ride on a track, at least one drive wheel means on the vehicle below the platform, said drive wheel means including a drive wheel oscillatable about an upright axis, a control member including a cam follower located adjacent one end of the vehicle, a speed control device including a cam surface supported by the vehicle and being located adjacent the other end of the vehicle, one of said control members and speed control devices being coupled to said drive wheel for oscillating said drive wheel and being mounted for oscillation between an accumulation position and a drive position, [one of] said cam surface [and cam follower] projecting beyond its respective end of said platform, said cam surface being at the same general elevation as said cam follower so that said speed control device may cooperate with a control member on another vehicle to control the speed of the other vehicle.

*14. Apparatus in accordance with claim 13 wherein said control member includes an arm which is radially disposed with respect to said upright axis, said cam follower being adjacent one end of said arm for contact with a cam projecting from the rear end of another vehicle.*

*15. Apparatus in accordance with claim 14 wherein said arm is angled with respect to the side edges of said vehicle when said drive wheel is in its drive position, said cam surface being on a side face of said speed control device for controlling the speed of another vehicle by moving the cam follower of another vehicle toward the longitudinal axis of the other vehicle.*

*16. Apparatus in accordance with claim 13 wherein said control device has a cam surface on a side face thereof and angled relative to the sides of the vehicle so that it may impart a force against the cam follower of another vehicle in a direction generally transverse of the vehicles.*

*17. Apparatus comprising a driverless vehicle mounted on support wheels adapted to ride on a track, at least one drive wheel means on the bottom side of said vehicle, said drive wheel means including a drive wheel oscillatable about an upright axis, a control member in at least one position thereof projecting forwardly of the vehicle relative to said drive wheel and terminating at a free end adjacent the vehicle front end, said control member being coupled to said drive wheel means for oscillating said drive wheel means about said axis, said drive wheel means including a drive wheel support, said drive wheel being mounted on said support for rotation, said control member being rigidly connected to said drive wheel support for oscillation therewith between an accumulation position and a drive position, and a speed control device supported by the vehicle and projecting generally rearwardly of the vehicle beyond the rear end thereof, the projection of said speed control device terminating in a free end and being at the same general elevation as said control member so that it may oscillate a control member on another vehicle to control the speed of the other vehicle with gradual deceleration.*

*18. Apparatus in accordance with claim 17 wherein said control member includes an arm which is radially disposed with respect to said upright axis, a cam follower adjacent one of said arm for contact with a cam projecting from the rear end of another vehicle.*

*19. Apparatus in accordance with claim 17 wherein said control device has a cam surface on a side face thereof and wherein the cam surface is angled relative to the sides of the vehicle so that it may impart a force against a cam follower of another vehicle in a direction transverse of the vehicle.*

*20. Apparatus comprising a driverless vehicle having support wheels adapted to ride on a track, at least one drive wheel means on the bottom side of said vehicle, said drive wheel means including a drive wheel oscillatable about an upright axis and adapted for frictional contact with a drive tube rotatable about its longitudinal axis, a control mem-* ber in at least one position thereof projecting generally forwardly of the vehicle relative to said drive wheel and terminating at a free end adjacent the front end of the vehicle, said control member being coupled to said drive wheel means for oscillating said drive wheel means about said axis, said drive wheel means including a drive wheel support, said drive wheel being mounted on said support for rotation, said control member being connected to said drive wheel support and arranged for oscillation about said axis between an accumulation position and a drive position, and a speed control device supported by the vehicle and extending generally longitudinally of the vehicle, said speed control device terminating at an end adjacent the rear end of said vehicle and being at the same general elevation as said control member so that it may oscillate a control member on another vehicle to control the speed of the other vehicle with gradual deceleration and acceleration as a function of the distance between the vehicles after contact between said control member and a control device on the other vehicle.

21. Apparatus in accordance with claim 20 wherein said control member includes an arm which is radially disposed with respect to said upright axis, a cam follower having an outer periphery which is round, said cam follower being supported by said arm adjacent a free end of said arm for contact with a speed control device supported adjacent the rear end of another vehicle.

22. Apparatus in accordance with claim 21 wherein said arm is angled with respect to the side edges of said vehicle when said drive wheel is in its drive position, a cam surface on a side face of said speed control device for controlling the speed of another vehicle by moving the cam follower of another vehicle toward the longitudinal axis of the other vehicle.

* * * * *